US008718896B2

(12) United States Patent
Wang et al.

(10) Patent No.: US 8,718,896 B2
(45) Date of Patent: May 6, 2014

(54) HYBRID VEHICLE AND ASSOCIATED OUTPUT TORQUE CONTROL METHOD

(75) Inventors: Qing Wang, Canton, MI (US); Ming Lang Kuang, Canton, MI (US); Fazal Urrahman Syed, Canon, MI (US); Ryan Abraham McGee, Ann Arbor, MI (US); Kenneth Frederick, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/539,898

(22) Filed: Jul. 2, 2012

(65) Prior Publication Data

US 2014/0005865 A1    Jan. 2, 2014

(51) Int. Cl.
*B60K 23/04* (2006.01)
*B60W 50/038* (2012.01)
*B60W 10/113* (2012.01)
*B60W 10/119* (2012.01)

(52) U.S. Cl.
USPC .............. 701/82; 701/70; 701/74; 701/87; 701/90; 123/406.23

(58) Field of Classification Search
CPC ........... B60W 10/101; B60W 10/103; B60W 10/105; B60W 10/107; B60W 10/108; B60W 10/109; B60W 10/119
USPC ............. 701/70, 79, 82–90, 110; 123/185.15, 123/406.23
See application file for complete search history.

(56) References Cited

U.S. PATENT DOCUMENTS

| | | | |
|---|---|---|---|
| 6,405,121 B2 * | 6/2002 | Tamura et al. .................. 701/96 |
| 6,909,959 B2 * | 6/2005 | Hallowell ........................ 701/88 |
| 7,261,671 B2 * | 8/2007 | Ortmann et al. .................. 477/6 |
| 7,331,899 B2 * | 2/2008 | Ortmann et al. .................. 477/6 |
| 7,676,313 B2 | 3/2010 | Ortmann et al. |
| 7,869,926 B2 | 1/2011 | Tuckfield et al. |
| 7,921,943 B2 | 4/2011 | Ueoka et al. |
| 8,500,589 B2 * | 8/2013 | Ortmann et al. ............. 475/152 |
| 2002/0065589 A1 * | 5/2002 | Ostberg et al. .................. 701/22 |
| 2004/0030480 A1 * | 2/2004 | Kadota et al. .................. 701/70 |
| 2004/0176899 A1 * | 9/2004 | Hallowell ........................ 701/84 |
| 2005/0143877 A1 * | 6/2005 | Cikanek et al. .................. 701/22 |
| 2006/0231305 A1 * | 10/2006 | Severinsky et al. .......... 180/65.2 |
| 2006/0231306 A1 * | 10/2006 | Severinsky et al. .......... 180/65.2 |
| 2007/0093341 A1 * | 4/2007 | Supina et al. ..................... 475/5 |
| 2008/0243324 A1 * | 10/2008 | Harris ............................ 701/22 |
| 2011/0202222 A1 * | 8/2011 | Yamamoto ...................... 701/22 |

* cited by examiner

*Primary Examiner* — Mary Cheung
*Assistant Examiner* — Atul Trivedi
(74) *Attorney, Agent, or Firm* — David B. Kelley; Brooks Kushman P.C.

(57) ABSTRACT

A hybrid vehicle and method of control are disclosed. An internal combustion engine and at least one traction motor are operated such that the combined output torque corresponds to one of a plurality of output torque functions, each output torque function having a distinct output torque at a maximum value of accelerator pedal position for an associated vehicle speed. The output torque function is selected based on a virtual gear number. The virtual gear number varies in response to driver activation of shift selectors or automatically in response to changes in vehicle speed.

14 Claims, 13 Drawing Sheets

HYBRID VEHICLE AND ASSOCIATED OUTPUT TORQUE CONTROL METHOD

TECHNICAL FIELD

This disclosure relates generally to controlling the engine speed and combined output torque of a hybrid vehicle in response to driver inputs.

BACKGROUND

In a vehicle having a discrete ratio transmission, the speed of the transmission input shaft is constrained to be proportional to the vehicle speed with a finite set of ratios, except during the brief interval while the transmission is shifting from one ratio to another ratio. When the torque converter is locked, the engine speed is also constrained to be proportional to vehicle speed. In a hybrid electric vehicle having a power-split architecture, on the other hand, the transmission does not mechanically impose a strict relationship between the engine speed and the vehicle speed.

Even in vehicles with automatic transmissions, in which selection of the gear ratio or engine speed is ordinarily determined by a controller, some drivers prefer to occasionally over-ride the controller to provide operation similar to a manual transmission. Some vehicles are equipped with shift paddles or other driver interface features which permit the driver to signal a desire for a higher or a lower gear ratio relative to the gear ratio automatically selected by the vehicle controller, with an associated change in engine speed and vehicle torque. In a discrete ratio transmission, the controller responds to such a command by shifting to a different one of the discrete gear ratios, which adjusts engine speed accordingly and provides associated torque multiplication at the vehicle wheels. However, in a vehicle with a continuously variable transmission or similar gearbox, such as a power-split hybrid, the response is more complicated because the transmission does not inherently provide discrete gear ratios with associated different torque multiplication.

SUMMARY

In various embodiments, a hybrid vehicle control strategy implements four different operating modes. The vehicle controller determines which operating mode is utilized at any given time in response to operation of various driver interface elements including a shift lever, a downshift selector, and an upshift selector, for example. In two of the operating modes, the controller simulates the operation of a discrete ratio transmission, both with regard to the engine speed and with regard to the combined output torque of the engine and one or more traction motors. The controller can utilize different logic for shutting the engine off and driving solely with electric power depending on which operating mode is active.

In one embodiment, a method of controlling a hybrid electric vehicle having a driver operated accelerator pedal, an engine, and at least one traction motor includes operating the engine and at least one traction motor such that combined output torque corresponds to one of a plurality of output torque functions, each output torque function having a distinct output torque at a maximum value of accelerator pedal position for an associated vehicle speed. The method can also include controlling the combined output torque in response to a modified accelerator pedal position value wherein the modified accelerator pedal position is a function of accelerator pedal position and a virtual gear number, and the modified accelerator pedal position assumes a different value for each virtual gear number at a maximum value of accelerator pedal position. In one embodiment, the method includes controlling the combined output torque in response to a target output torque, which is a function of a raw output torque value and a virtual gear number. The raw output torque value is a function of accelerator pedal position and vehicle speed, and the target output torque value assumes a different value for each virtual gear number at a maximum value of raw output torque value. In one embodiment, the method includes controlling the combined output torque in response to a target output torque wherein the target output torque is based on a difference between a raw output torque and an output torque adjustment, the raw output torque is a function of accelerator pedal position and vehicle speed, and the output torque adjustment is a function of raw output torque and a virtual gear number.

Various embodiments of a method for controlling a hybrid vehicle according to the disclosure can include operating the engine and at least one traction motor at a reduced combined output torque corresponding to one of a plurality of output torque functions, and operating the engine and the at least one traction motor combined output torque corresponding to a different one of the plurality of output torque functions in response to driver operation of an upshift selector. In one embodiment, the method further includes operating the engine and at least one traction motor at an increased combined output torque corresponding to a different one of the plurality of output torque functions in response to operation of a shift selector.

Embodiments according to the present disclosure can also include a controller for a hybrid electric vehicle having input communication channels that receive a vehicle speed, a position of a driver operated accelerator pedal, and signals associated with operation of a downshift selector, output communication channels that deliver signals to control an engine and at least one traction motor, and control logic configured to operate the engine and at least one traction motor such that combined output torque corresponds to one of a plurality of output torque functions, each output torque function having a distinct output torque at a maximum value of accelerator pedal position for an associated vehicle speed. The controller can include control logic configured to operate the engine and at least one traction motor such that combined output torque corresponds to a different one of the plurality of output torque functions in response to a change in vehicle speed. The controller can also include control logic configured to operate the engine and at least one traction motor such that combined output torque corresponds to a different output torque function selected from the plurality of output torque functions in response to operation of the downshift selector, the different output torque function resulting in a higher output torque than an immediately previously selected output torque function at current vehicle speed and accelerator pedal position.

In various embodiments, a hybrid vehicle includes a controller having an input communication channel that receives signals associated with operation of an upshift selector and control logic configured to operate the engine and at least one traction motor such that combined output torque corresponds to a different output torque function selected from the plurality of output torque functions in response to operation of the upshift selector, the different output torque function resulting in a lower output torque than an immediately previously selected output torque function at current vehicle speed and accelerator pedal position.

In one embodiment, a hybrid vehicle includes a transmission driveably connected to an engine, a first traction motor, and vehicle wheels, a second traction motor driveably connected to the vehicle wheels, and a controller programmed to operate the engine and the traction motors such that combined output torque corresponds to one of a plurality of output torque functions each having a distinct output torque at a maximum value of accelerator pedal position for an associated vehicle speed. The controller can be further programmed to operate the engine and the traction motors such that combined output torque corresponds to a different one of the plurality of output torque functions in response to a change in vehicle speed. The controller can also be programmed to operate the engine and the traction motors such that combined output torque corresponds to a different one of the plurality of output torque functions in response to operation of a downshift selector, the different output torque function resulting in a higher output torque than the immediately previously selected function at current vehicle speed and accelerator pedal position. The controller can also be further programmed to operate the engine and the traction motors such that combined output torque corresponds to a different one of the plurality of output torque functions in response to operation of an upshift selector, the different output torque function resulting in a lower output torque than the immediately previously selected function at current vehicle speed and accelerator pedal position.

Various embodiments according to the present disclosure can provide one or more advantages. For example, systems and methods for controlling a hybrid vehicle according to the present disclosure mimic or emulate a manual or select shift mode of an automatic step-ratio transmission in a hybrid vehicle having a continuously variable transmission or similar gearbox. In addition, various strategies of the present disclosure provide drivers of hybrid vehicles more interactive controls to manually command powertrain speed and acceleration to provide enhanced luxury features and a sporty feel.

The above advantages and other advantages and features will be readily apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
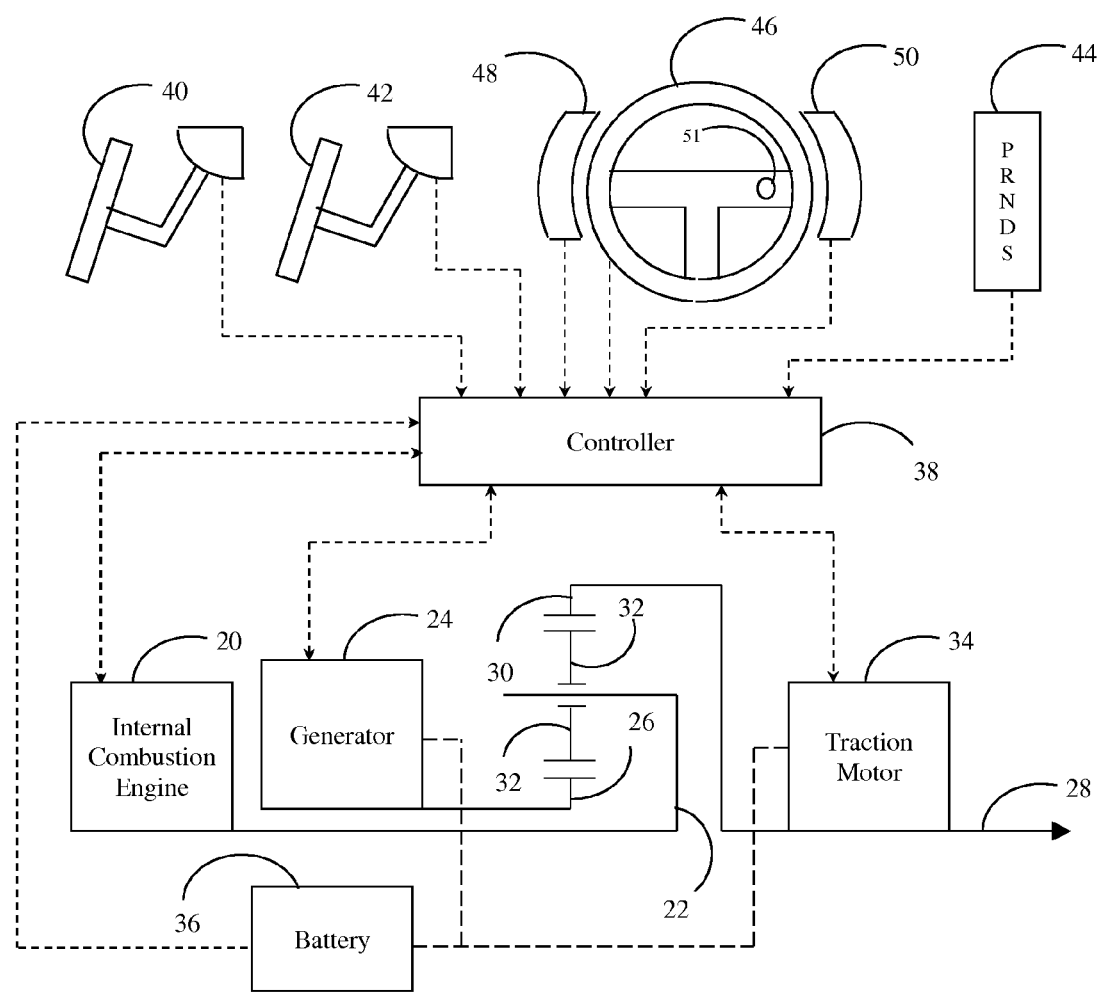
FIG. 1 is a schematic diagram illustrating a vehicle powertrain, controller, and user interface features of a representative embodiment of a hybrid vehicle according to the present disclosure.

A powertrain for a hybrid electric vehicle is illustrated schematically in FIG. 1. The powertrain includes an internal combustion engine 20 driveably connected to a planet carrier 22, a generator 24 driveably connected to a sun gear 26, and an output shaft 28 driveably connected to a ring gear 30. Elements are driveably connected when there is a mechanical power flow path between them such that the speeds of the elements are constrained to be substantially proportional. Planet carrier 22 supports a set of planet gears 32 such that each planet gear is in continuous meshing engagement with sun gear 26 and ring gear 30. Output shaft 28 drives the vehicle wheels directly or indirectly, such as via a differential assembly, for example.

Traction motor 34 is driveably connected to the output shaft 28. Both the generator 24 and the traction motor 34 are reversible electrical machines that are capable of converting electrical power into rotational mechanical power or converting rotational mechanical power into electrical power. The terms generator and motor should be regarded merely as labels for ease of description and does not limit the function or operation of either electrical machine. Generator 24 and traction motor 34 are both electrically connected to battery 36.

The rotational speed of sun gear 26, carrier 22, and ring gear 30 are linearly related such that speed of carrier 22 is a weighted average of the speed of sun gear 26 and ring gear 30. Consequently, the speed of the engine 20 is not constrained to be proportional to the speed of the output shaft 28 in this arrangement. Instead, the engine speed can be selected or controlled independently of the vehicle speed by setting the generator speed accordingly. Power flows from the engine to the output shaft through a combination of mechanical power transfer and electrical power transfer. During some operating conditions, the engine 20 can generate more power than what is delivered to the output shaft 28 with the difference, neglecting efficiency losses, delivered to battery 36. Under other operating conditions, the battery 36 in combination with generator 24 and/or traction motor 34 can supplement the power delivered by the engine 20 such that more power is delivered to the output shaft 28.

The engine 20, generator 24, and traction motor 34, all respond to control signals from controller 38. These control signals determine the amount of torque generated. The controller also receives speed signals from the engine 20, generator 24, and traction motor 34 and a state of charge signal from battery 36. The controller accepts input signals indicating driver intention from a brake pedal 40, an accelerator pedal 42, a shift lever 44, a steering wheel 46, a downshift selector 48, an upshift selector 50, and a cruise control button 51. Shift lever 44 allows the driver to select Park, Reverse, Neutral, Drive, and Sport driving modes.

Figure 2:
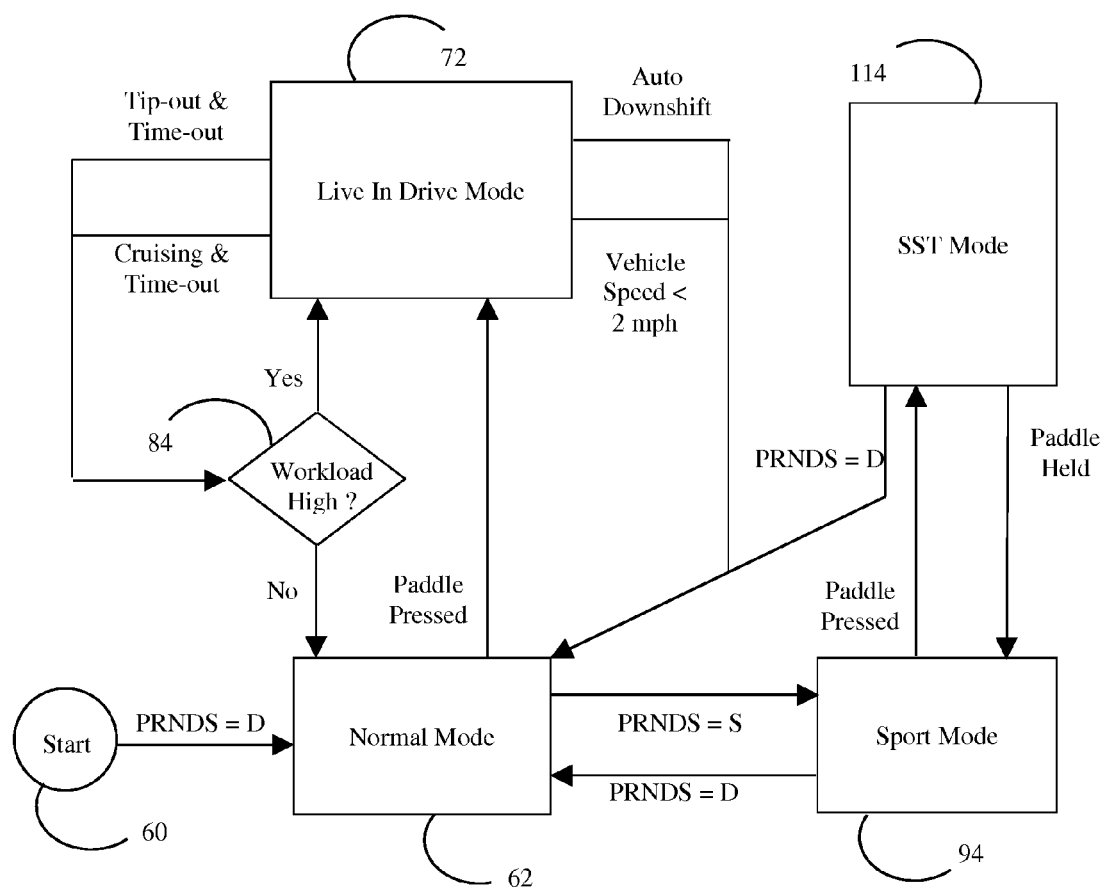
FIG. 2 is a state transition chart illustrating operation of a system or method of an embodiment of the present disclosure.
Figure 3:
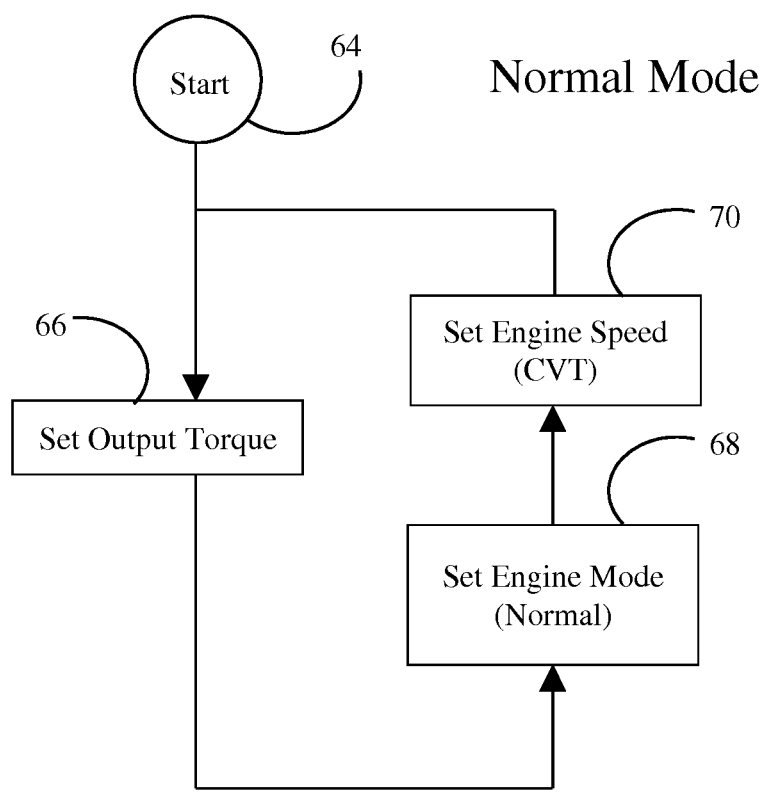
FIG. 3 is a flow chart illustrating operation of a system or method according to various embodiments when in a Normal operating mode.
Figure 4:
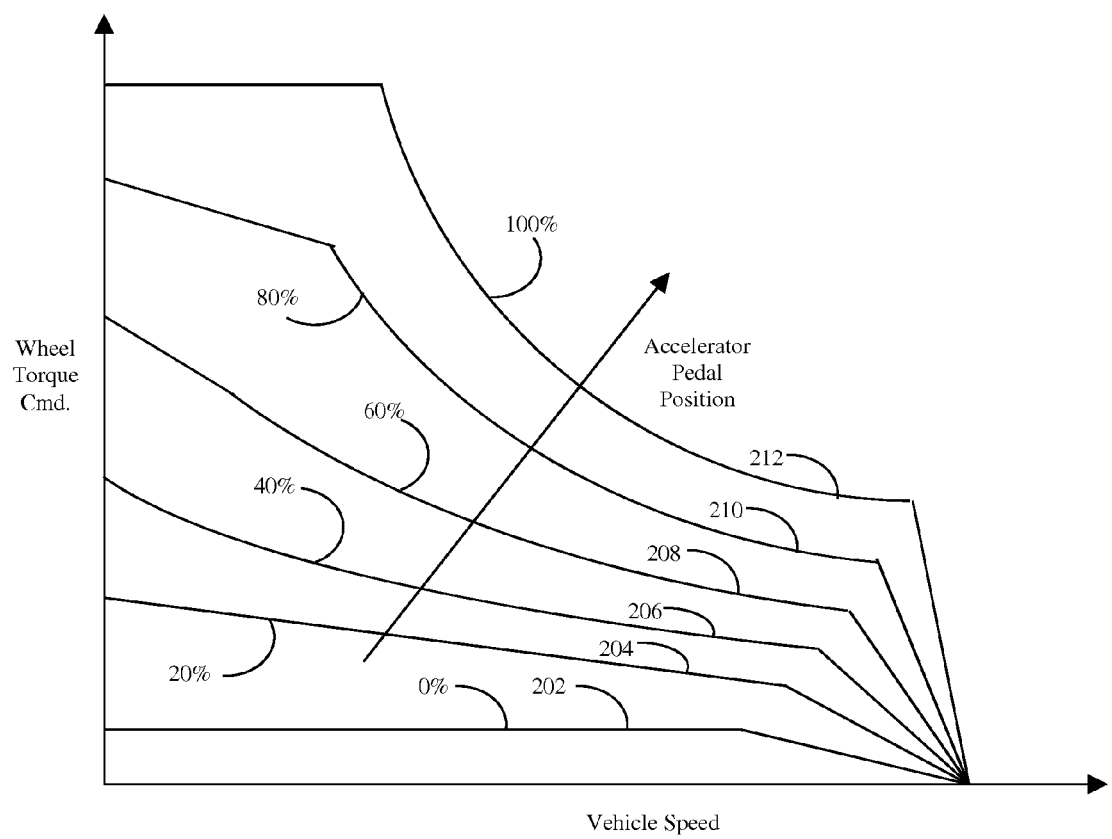
FIG. 4 is a graph illustrating a relationship between vehicle speed, accelerator pedal position, and wheel torque command of a representative embodiment according to the disclosure.

The top level control states are illustrated in FIG. 2. The controller starts in state 60 and transitions to Normal mode 62 as soon as the driver selects the Drive (D) position using shift lever 44. Operation in Normal mode is illustrated by the flow diagram of FIG. 3. In Normal mode, the controller repeatedly performs the operations of setting the output torque 66, setting the engine mode 68, and setting the engine speed 70. In Normal mode, the target output torque is calculated at step 66 based on accelerator pedal position and vehicle speed using a table such as that illustrated in FIG. 4. Vehicle speed can be calculated from traction motor speed or wheel speed sensors. Engine mode is set to either running or stopped at step 68 using a variety of input signals including battery state of charge, output power command, accelerator pedal position, and vehicle speed. If the engine mode is running, a target engine speed is calculated to minimize fuel consumption while delivering the desired output torque and maintaining the battery at a desired state of charge. In this Continuously Variable Transmission (CVT) mode, the engine speed varies continuously, as opposed to varying in discrete steps, in response to changes in accelerator pedal position and vehicle speed. Finally, operating parameters of the engine, generator, and traction motor are adjusted such that the actual output torque and engine speed tend toward the selected targets.

Referring again to FIG. 2, the controller transitions from Normal mode 62 to Live-In-Drive (LID) mode 72 whenever the driver activates the downshift selector 48. LID mode simulates the experience of driving a vehicle with a discrete ratio transmission. Operation in LID mode is illustrated by the flow diagram of FIG. 5. Upon entering LID mode, the controller selects an initial virtual gear ratio at step 74 and then repeatedly performs the operations of setting the output torque at steps 76 and 66', setting the engine speed at step 78, and updating the virtual gear ratio in steps 80 and 82. Each of these operations is discussed in additional detail below. As shown in FIG. 2, a number of conditions cause the controller to transition back to Normal mode 62 including vehicle speed dropping below a low threshold value or an automatically selected downshift. Additionally, a transition can be triggered when the controller detects a cruising condition, as indicated by activation of the cruise control 51, or a tip-out condition, indicated by a reduction in accelerator pedal position, and the condition persists for some predetermined amount of time. This latter type of condition will not result in a transition, however, if the controller detects a high driver workload at step 84, such as might be indicated by large displacements of steering wheel 46, large yaw, pitch, or roll rates, or high longitudinal or lateral accelerations, for example.

Figure 5:
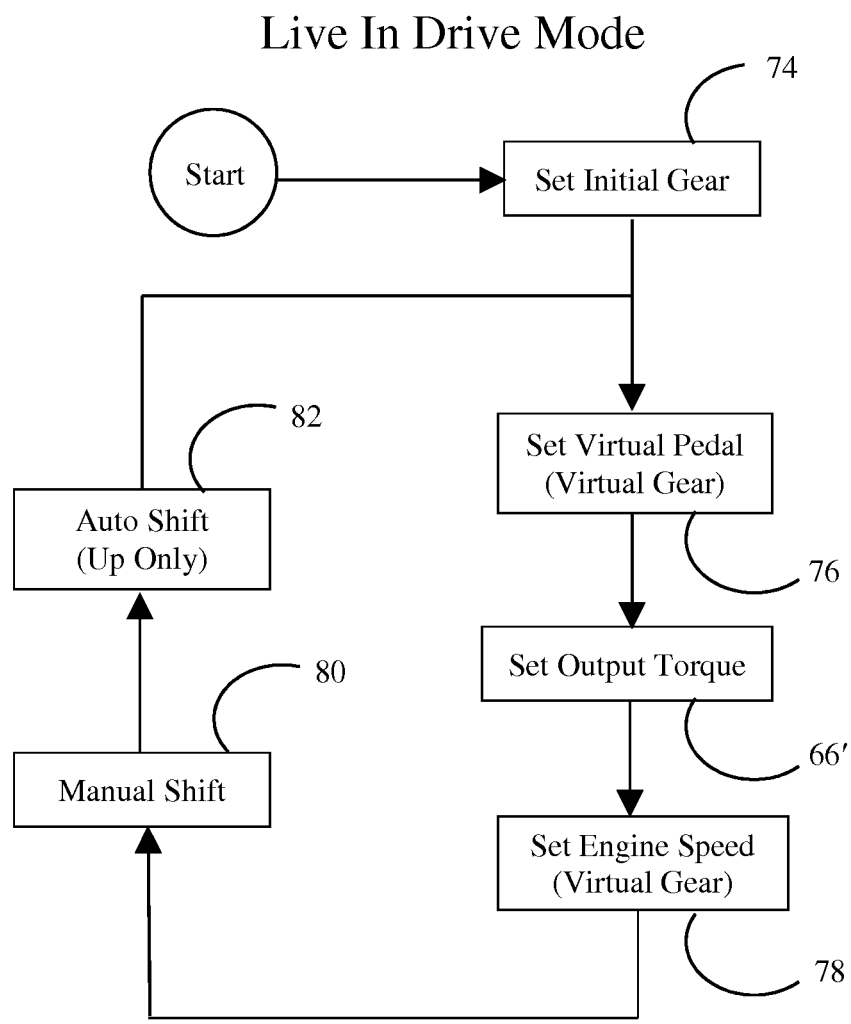
FIG. 5 is a flow chart illustrating operation of a system or method according to various embodiments when in the Live-In-Drive (LID) operating mode.
Figure 6:
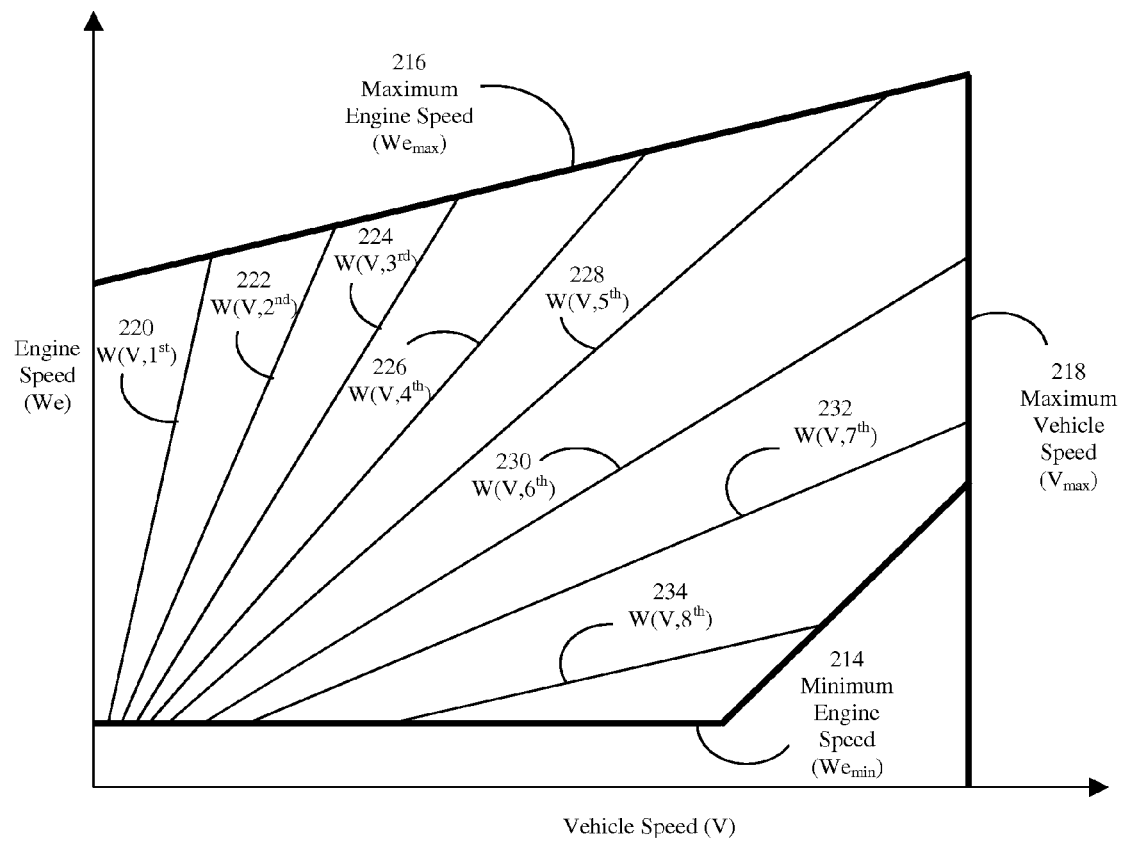
FIG. 6 is a graph illustrating a relationship between vehicle speed, virtual gear number, and engine speed of a representative embodiment according to the disclosure.

As also shown in FIG. 5, in LID mode 72, the engine speed is calculated in step 78 based on the vehicle speed and the virtual gear number as illustrated in FIG. 6. For a particular virtual gear number ($1^{st}$ through $8^{th}$ in the representative embodiment illustrated), the engine speed (We) is directly proportional to vehicle speed (V), as it would be with a step ratio transmission. However, if that fixed ratio would result in an engine speed (We) less than a minimum engine speed ($We_{min}$), the engine speed (We) is set to the minimum engine speed ($We_{min}$). Similarly, the engine speed (We) is not set higher than a maximum engine speed ($We_{max}$). Both minimum and maximum engine speeds can be a function of vehicle speed (V).

Figure 7:
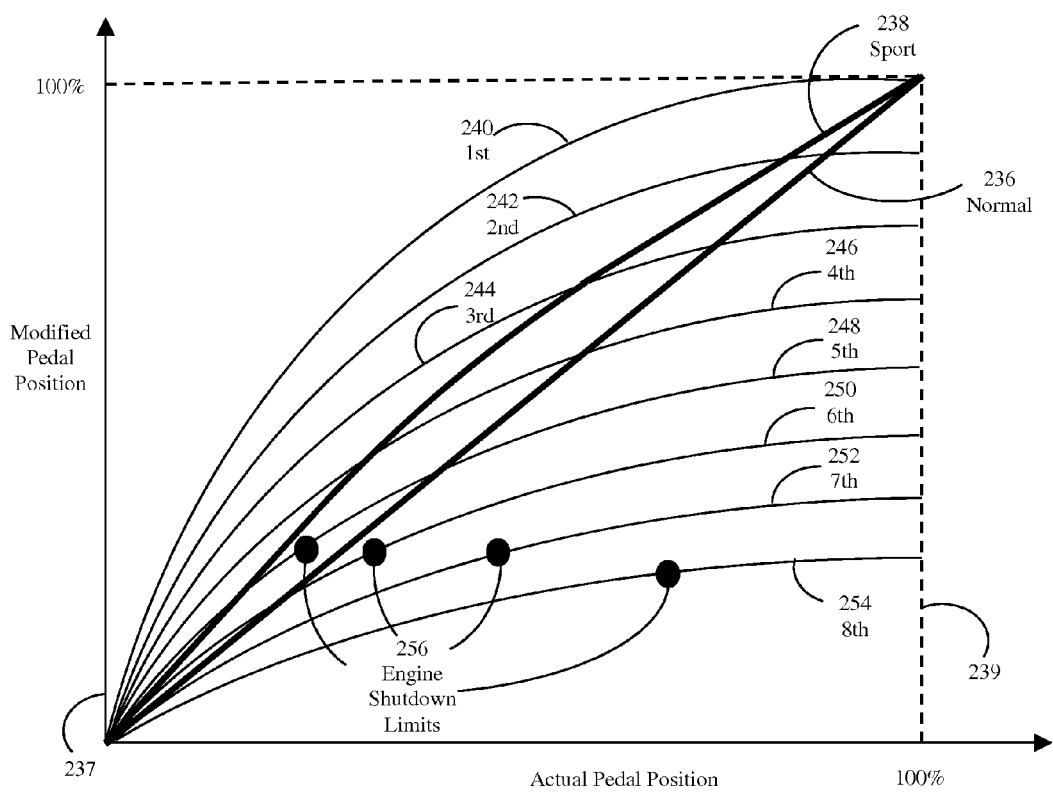
FIG. 7 is a graph illustrating a relationship between actual accelerator pedal position, virtual gear number or operating mode, and modified pedal position of a representative embodiment according to the disclosure.

In step 76, a modified accelerator pedal position is calculated from the measured accelerator pedal position using a table such as illustrated in FIG. 7. This modified accelerator pedal position is used in place of the actual pedal position in step 66' to calculate the target output torque. The curves in FIG. 7 are selected to simulate the output torque capability of a powertrain with a discrete ratio transmission. Specifically, as the virtual gear number ($1^{st}$ through $8^{th}$ in this example) increases, the resulting target output torque is lower for any given non-zero accelerator pedal position. The combined effect of steps 76 and 66' is operation of the engine and at least one traction motor such that combined output torque corresponds to one of a plurality of output torque functions, each output torque function having a distinct output torque at a maximum value of accelerator pedal position for an associated vehicle speed.

Figure 12:
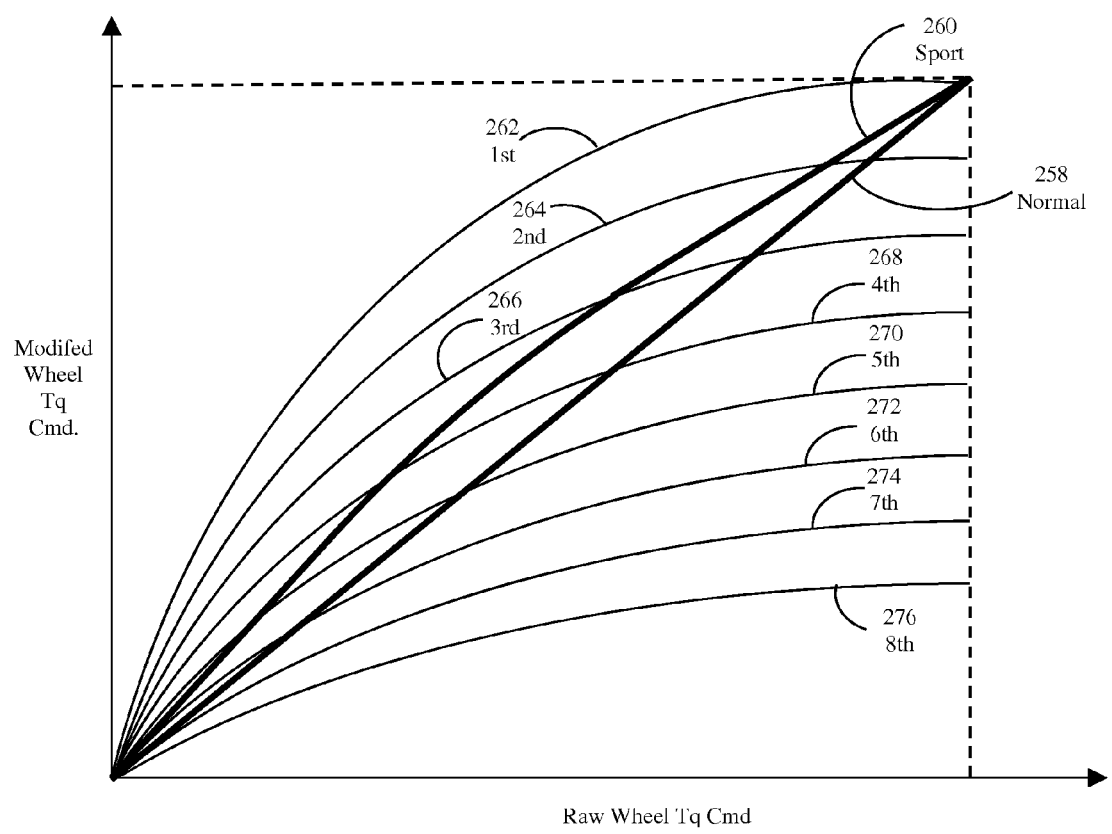
FIG. 12 is a graph illustrating a relationship between raw wheel torque, virtual gear number or operating mode, and modified wheel torque command of a representative embodiment according to the disclosure.
Figure 13:
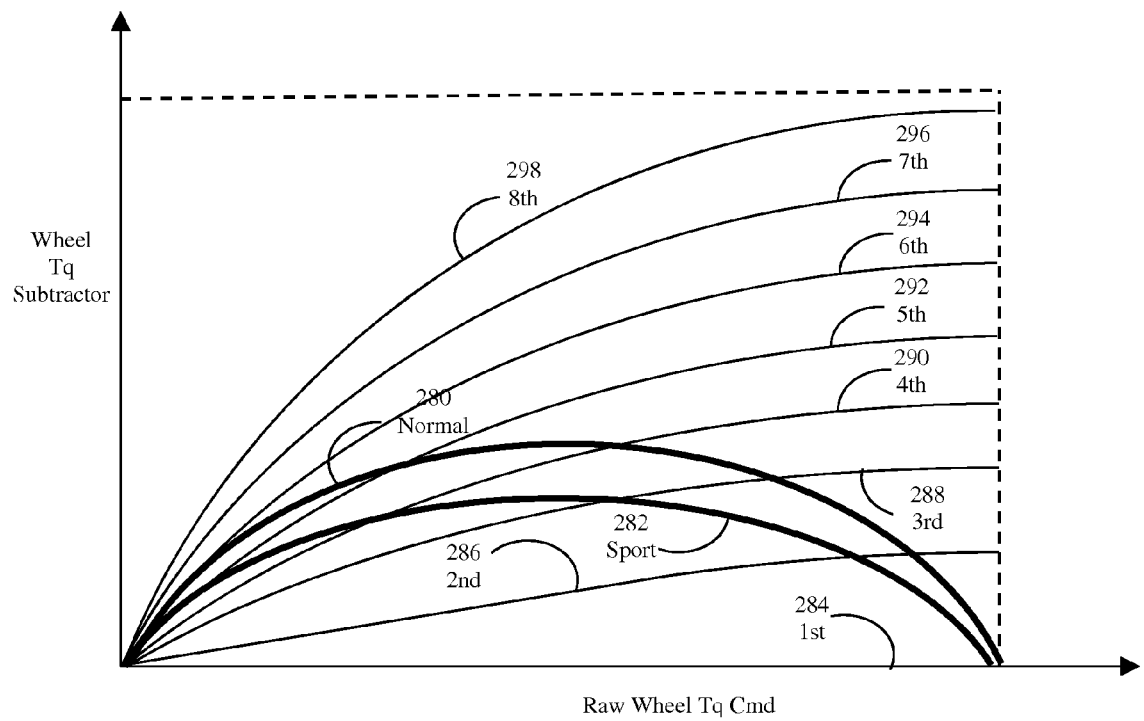
FIG. 13 is a graph illustrating a relationship between raw wheel torque, virtual gear number or operating mode, and a quantity to be subtracted from raw wheel torque to yield a wheel torque command of a representative embodiment of the disclosure.

Alternative methods of computing the wheel torque command are illustrated in FIGS. 12 and 13. In the first alternative method, a raw wheel torque command is computed based actual pedal position and vehicle speed using a function such as that illustrated in FIG. 4. Then a modified wheel torque command is computed based on a function of virtual gear number or operating mode and the raw wheel torque command such as the function illustrated in FIG. 12. In the second alternative method, a raw wheel torque command is computed similarly and a wheel torque subtractor is computed based on a function of virtual gear number or operating mode and the raw wheel torque command such as the function illustrated in FIG. 13. Then, the modified wheel torque command is computed by subtracting the wheel torque subtractor from the raw wheel torque command. These alternative methods all yield similar wheel torque commands for any particular values of vehicle speed, actual pedal position, and virtual gear number.

As also shown in FIG. 5, in step 80, the controller checks for activations of either the upshift selector or the downshift selector and adjusts the virtual gear number accordingly. In step 82, the controller determines if there is a need to automatically adjust the virtual gear number. In particular, an upshift can be triggered by an increase in vehicle speed. Similarly, a downshift can be indicated when vehicle speed decreases. However, as mentioned previously, the controller transitions back to Normal mode 62 when an automatic downshift is indicated. The automatic shift criteria are calibrated such that automatic changes in virtual gear number are less common than shifts in a traditional discrete ratio automatic transmission.

Figure 8:
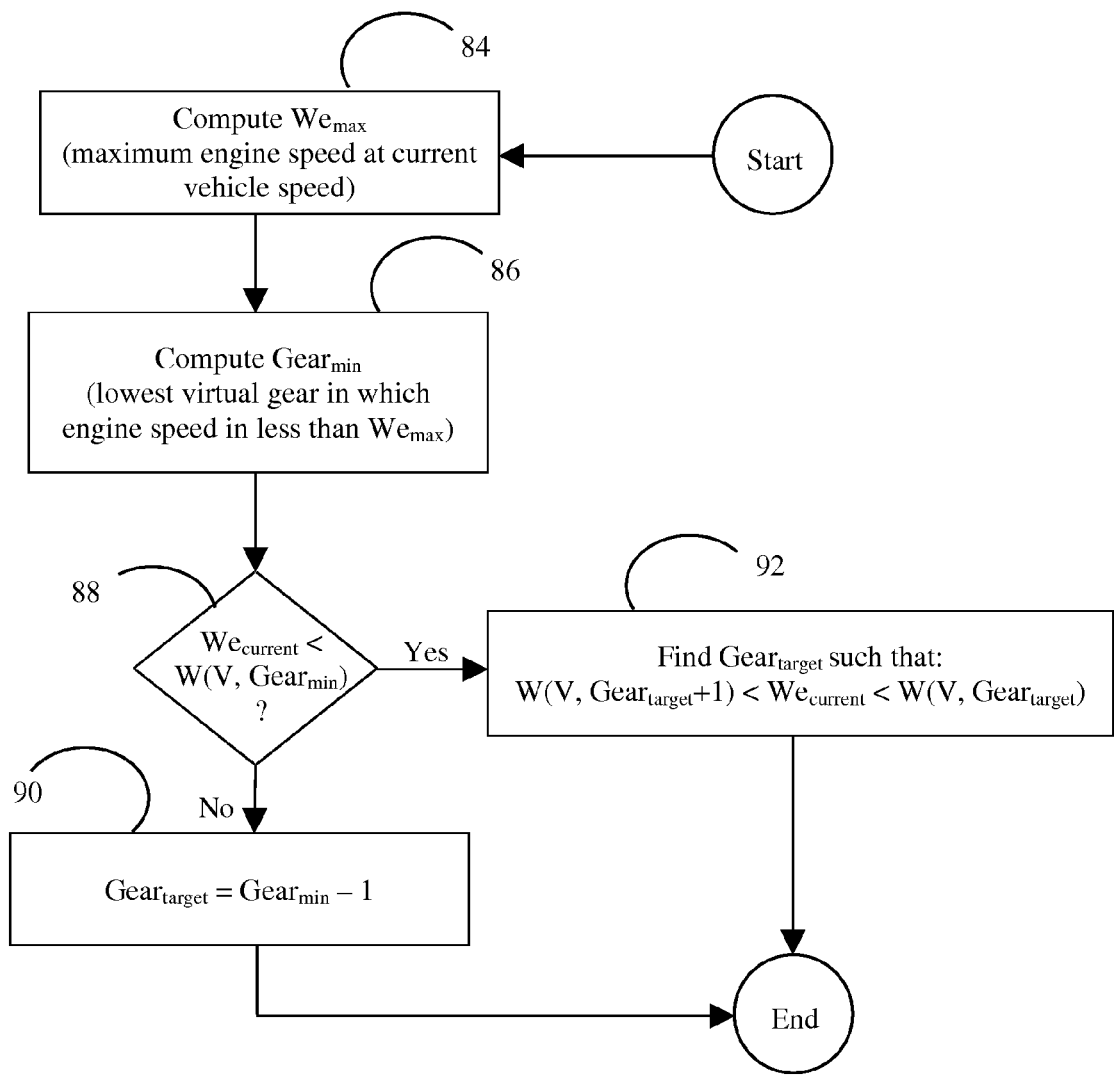
FIG. 8 is flow chart illustrating the selection of an initial virtual gear number when transitioning into LID or Select Shift Transmission (SST) operating modes of one embodiment of the disclosure.

The algorithms for calculating target engine speed and target output torque both utilize the virtual gear number. Therefore, an initial virtual gear number is determined upon transitioning into LID mode. At step 74, the controller selects an initial virtual gear number that will result in an increase in engine speed. The procedure for setting the initial virtual gear number is further illustrated in the flow chart of FIG. 8. In step 84, the controller calculates $We_{max}$, the maximum engine speed at the current vehicle speed, using a formula or a lookup table, for example. Next, in step 86, the controller computes $Gear_{min}$, the lowest virtual gear number for which the target engine speed would be less than $We_{max}$ at the current vehicle speed. This step can be done with either an iterative algorithm or using a lookup table. Next, the controller computes the target engine speed corresponding to $Gear_{min}$ at the current vehicle speed, $W(V, Gear_{min})$. In step 88, this is compared to the current engine speed, $We_{current}$. If $We_{current}$ is greater than $W(V, Gear_{min})$, then the target engine speed will be restricted by maximum engine speed. Consequently, in step 90, the target gear is set to $Gear_{min}$-1 and the target engine speed is set to $We_{max}$. However, in the more typical case where $We_{current}$ is less than $W(V, Gear_{min})$, step 92 selects the highest virtual gear number that will result in an increase in engine speed relative to the current engine speed.

Referring once again to FIG. 2, the controller transitions from Normal mode 62 to Sport mode 94 whenever the driver moves the shift lever 44 to the Sport (S) position. Operation in Sport mode is illustrated by the flow diagram of FIG. 9. The controller repeatedly performs the operations of setting the output torque 96 and 66'', setting the engine speed 99, and setting the engine mode 98. To provide a more sporty reaction to accelerator pedal movements, the target output torque is computed based on a modified accelerator pedal position as illustrated by the upper heavy line 238 in FIG. 7. The mapping between actual accelerator pedal position and modified accelerator pedal position is selected such that the value is equal at the minimum 237 and maximum 239 values, but the modified value is higher for all intermediate levels.

Figure 9:
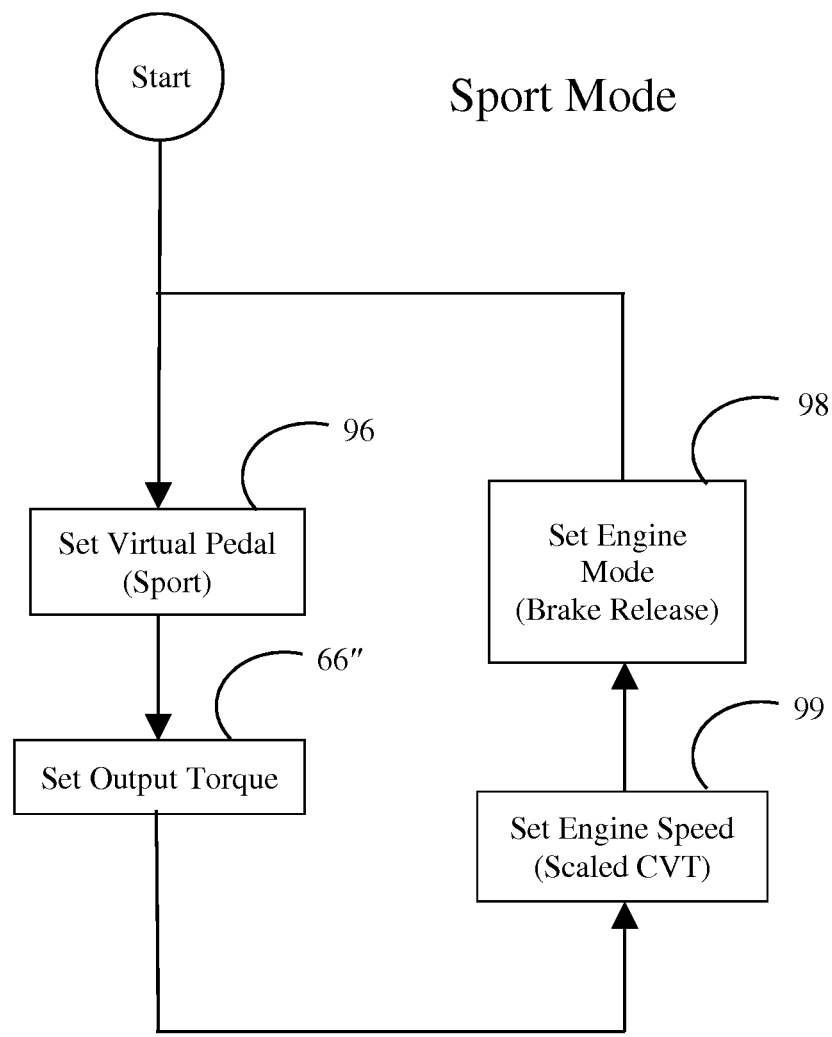
FIG. 9 is flow chart illustrating operation of a system or method according to embodiments of the disclosure when in the Sport operating mode.
Figure 10:
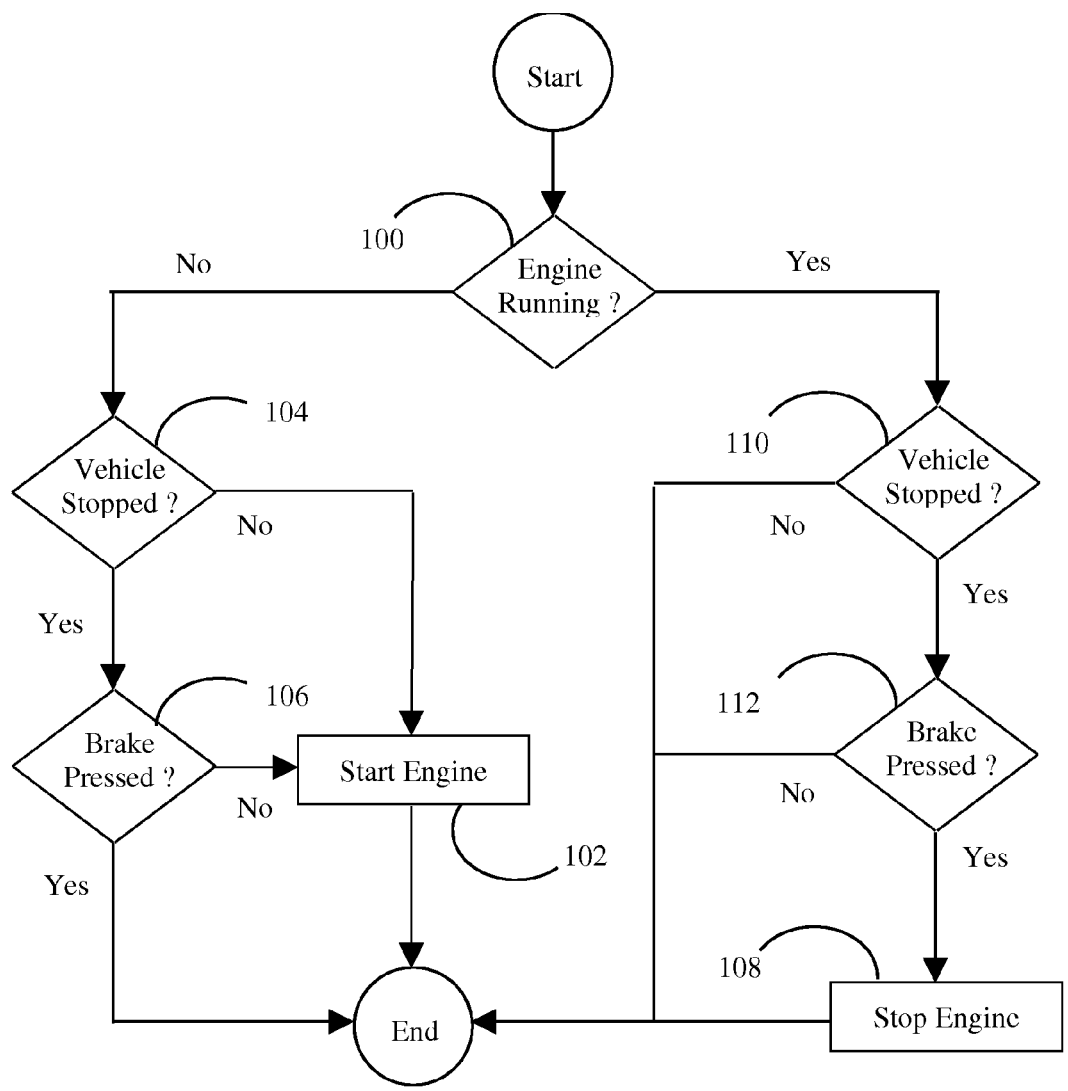
FIG. 10 is a flow chart illustrating operation of a strategy for shutting off and restarting the engine in certain operating modes of various embodiments of the disclosure.

As also shown in FIG. 9, target engine speed is set in step 99 using a similar algorithm to that used in Normal mode. However, the target engine speed is scaled up by a designated amount, such as 10-20% for example, relative to the value that would be used in Normal mode. Unlike the algorithm for setting engine mode used in Normal mode, the algorithm used in Sport mode as indicated at step 98 only stops the engine when the vehicle is stationary and the brake pedal is depressed. The modified engine mode setting algorithm is illustrated in FIG. 10. If the engine is currently stopped 100, then the engine is restarted at step 102 if the vehicle is moving 104 or the brake pedal is released 106. Similarly, if the engine is currently running, then the engine is stopped at step 108 only if the vehicle is stationary 110 and the brake pedal is pressed 112.

Figure 11:
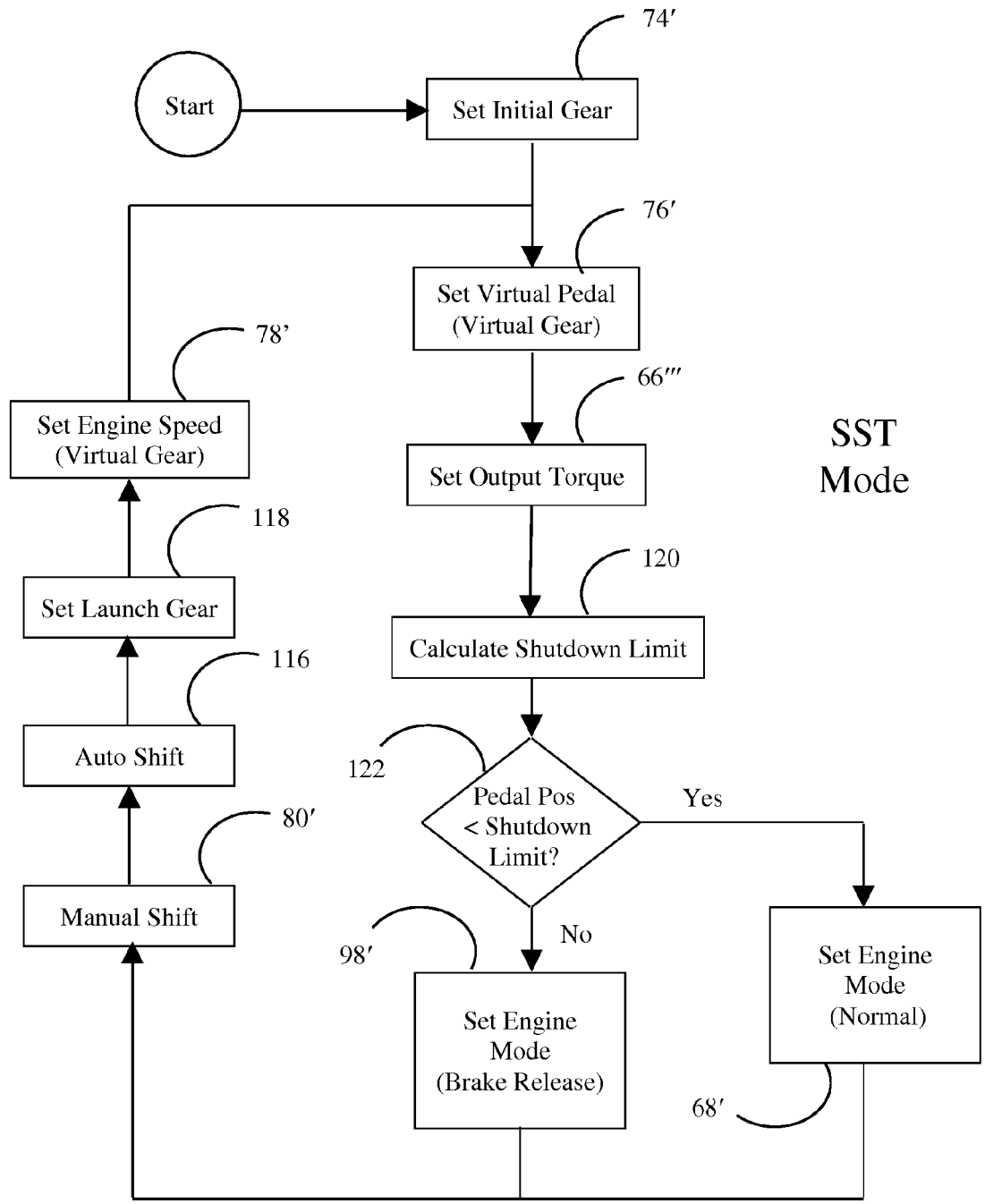
FIG. 11 is a flow chart illustrating operation of a system or method when in the SST operating mode according to various embodiments of the disclosure.

If the driver activates either the upshift of downshift selector while in Sport mode 94, the controller transitions to Select Shift Transmission (SST) mode 114, as shown in FIG. 2. In SST mode, the target engine torque and target engine speed are set to simulate a discrete ratio transmission, as described with respect to LID mode. However, the controller will remain in SST mode until the driver indicates a desire to leave this mode by either holding a shift selector 48 or 50 for several seconds of by moving shift lever 44 back to the Drive (D) position. Operation in SST mode is illustrated by the flow diagram of FIG. 11. In SST mode, the virtual gear number is adjusted at step 80' in response to activation of downshift selector 48 and upshift selector 50 in the same manner as in LID mode. In addition, the controller can automatically adjust the virtual gear number, either up or down, in response to changes in vehicle speed or accelerator pedal position. This automatic feature sets the virtual gear number to 1st gear as the vehicle comes to a stop. However, the driver can override this selection by manipulating the shift selectors while the vehicle is stationary in step 118. In SST mode, the engine mode depends on the virtual gear number, vehicle speed, and accelerator pedal position. In step 120, the controller calculates an engine shutdown limit, which is an accelerator pedal position below which electric drive is enabled. The shutdown limit is a function of output power demand, virtual gear number, and vehicle speed. The shutdown limits for several gear ratios at a particular vehicle speed and output power demand are illustrated by black circles in FIG. 7. When one of the higher virtual gear numbers, i.e. 5th-8th, is active and the accelerator pedal position is less than the shutdown limit, the normal engine mode algorithm 68' of Normal mode is used. If a lower virtual gear number, i.e. 1st-4th, is active, or if the accelerator position is above the engine shutdown limit, then the more restrictive algorithm 98' of Sport and LID modes is used.

As illustrated by the representative embodiments described above, various embodiments according to the present disclosure can provide one or more advantages, such as emulating a manual or select shift mode of an automatic step-ratio transmission in a hybrid vehicle having a continuously variable transmission or similar gearbox. In addition, various strategies of the present disclosure provide drivers of hybrid vehicles more interactive controls to manually command powertrain speed and acceleration to provide enhanced luxury features and a sporty feel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications.

What is claimed is:

1. A method of controlling a hybrid electric vehicle having a driver operated accelerator pedal, an engine, and at least one traction motor, comprising:
    operating the engine and at least one traction motor such that combined output torque corresponds to one of a plurality of output torque functions, wherein, at vehicle speeds less than a maximum speed, the combined output torque is different for each output torque function at a maximum value of accelerator pedal position.

2. The method of claim 1 further comprising:
    controlling the combined output torque in response to a modified accelerator pedal position signal based on accelerator pedal position and a virtual gear number, wherein the modified accelerator pedal position signal assumes a different value for each virtual gear number at a maximum value of accelerator pedal position.

3. The method of claim 1 further comprising:
    controlling the combined output torque in response to a target output torque value wherein the target output torque value is a function of a raw output torque value and a virtual gear number, the raw output torque value is a function of accelerator pedal position and vehicle speed, and the target output torque value assumes a different value for each virtual gear number at a maximum value of raw output torque value.

4. The method of claim 1 further comprising:
controlling the combined output torque in response to a target output torque value wherein the target output torque value is a difference between of a raw output torque value and an output torque adjustment value, the raw output torque value is a function of accelerator pedal position and vehicle speed, and the output torque adjustment value is a function of raw output torque and a virtual gear number.

5. The method of claim 1 further comprising:
in response to driver operation of an upshift selector, operating the engine and at least one traction motor at a reduced combined output torque corresponding to a different one of the plurality of output torque functions.

6. The method of claim 1 further comprising:
in response to driver operation of a downshift selector, operating the engine and at least one traction motor at an increased combined output torque corresponding to a different one of the plurality of output torque functions.

7. A controller for a hybrid electric vehicle, comprising:
input communication channels that receive a vehicle speed, a position of a driver operated accelerator pedal, and signals associated with operation of a downshift selector;
output communication channels that deliver signals to control an engine and at least one traction motor; and
control logic configured to operate the engine and at least one traction motor such that combined output torque corresponds to one of a plurality of output torque functions, each output torque function producing a different output torque at a maximum value of accelerator pedal position and a vehicle speed less than a maximum vehicle speed.

8. The controller of claim 7 further comprising:
control logic configured to operate the engine and at least one traction motor such that combined output torque corresponds to a different one of the plurality of output torque functions in response to a change in vehicle speed.

9. The controller of claim 7 further comprising:
control logic configured to operate the engine and at least one traction motor such that combined output torque corresponds to a different output torque function selected from the plurality of output torque functions in response to operation of the downshift selector, the different output torque function resulting in a higher output torque than an immediately previously selected output torque function at current vehicle speed and accelerator pedal position.

10. The controller of claim 7 further comprising:
an input communication channel that receive signals associated with operation of an upshift selector; and
control logic configured to operate the engine and at least one traction motor such that combined output torque corresponds to a different output torque function selected from the plurality of output torque functions in response to operation of the upshift selector, the different output torque function resulting in a lower output torque than an immediately previously selected output torque function at current vehicle speed and accelerator pedal position.

11. A vehicle comprising:
a transmission driveably connected to an engine, a first traction motor, and vehicle wheels;
a second traction motor driveably connected to the vehicle wheels; and
a controller programmed to operate the engine and the traction motors such that combined output torque corresponds to one of a plurality of output torque functions each function producing a different output torque at a maximum value of accelerator pedal position and a vehicle speed less than a maximum vehicle speed.

12. The vehicle of claim 11 wherein the controller is further programmed to operate the engine and the traction motors such that combined output torque corresponds to a different one of the plurality of output torque functions in response to a change in vehicle speed.

13. The vehicle of claim 11 wherein the controller is further programmed to operate the engine and the traction motors such that combined output torque corresponds to a different one of the plurality of output torque functions in response to operation of a downshift selector, the different output torque function resulting in a higher output torque than the immediately previously selected function at current vehicle speed and accelerator pedal position.

14. The vehicle of claim 11 wherein the controller is further programmed to operate the engine and the traction motors such that combined output torque corresponds to a different one of the plurality of output torque functions in response to operation of an upshift selector, the different output torque function resulting in a lower output torque than the immediately previously selected function at current vehicle speed and accelerator pedal position.

* * * * *